United States Patent [19]

Forgue et al.

[11] 4,333,004
[45] Jun. 1, 1982

[54] DETECTING ICE FORMING WEATHER CONDITIONS

[75] Inventors: John R. Forgue, Waterbury; Joshua I. Goldberg, Woodbridge; Leonard Seide, Westport, all of Conn.

[73] Assignee: Dataproducts New England, Inc., Wallingford, Conn.

[21] Appl. No.: 122,757

[22] Filed: Feb. 19, 1980

[51] Int. Cl.$^3$ .............................................. H05B 1/02
[52] U.S. Cl. ................................... 219/497; 219/499; 219/506; 219/494; 340/581; 340/580
[58] Field of Search ............... 219/497, 499, 494, 501, 219/507, 508, 506; 340/580, 581; 73/170 R, 362 AR, 362 R

[56] References Cited

U.S. PATENT DOCUMENTS

| | | | |
|---|---|---|---|
| 2,269,019 | 1/1942 | Hall | 340/581 |
| 2,775,679 | 12/1956 | Flubacker | 340/580 X |
| 2,914,755 | 11/1959 | Fraser | 340/580 |
| 2,916,731 | 12/1959 | Foster | 340/580 |
| 2,980,896 | 4/1961 | Robertson et al. | 340/580 |
| 3,277,459 | 10/1966 | Werner | 340/581 |
| 3,517,900 | 6/1970 | Roussel | 340/580 |
| 3,594,775 | 7/1971 | Fox | 340/581 |
| 3,596,263 | 7/1971 | Ciemochowski | 340/580 |
| 3,873,927 | 3/1975 | Overall | 340/580 |
| 4,210,021 | 7/1980 | Vykhodtsev et al. | 340/580 |

Primary Examiner—B. A. Reynolds
Assistant Examiner—M. Paschall
Attorney, Agent, or Firm—Spensley, Horn, Jubas & Lubitz

[57] ABSTRACT

Sensor and reference wires are directly exposed to the airflow past a vehicle. The wires are electrically conductive, and each has a resistance varying with its temperature. A continuous fixed voltage is passed through the reference wire. A short pulse of greater constant voltage is passed through the sensor wire, the voltage of sufficient magnitude to cause the rapid heating of the sensor wire during the pulse. The resultant rate of heat of the sensor wire, and its final temperature at the end of the pulse, is determined by whether ice or water is on the sensor wire. Circuitry is provided to generate an ice present signal when the difference in current flow during the pulse through the sensor wire and through the reference wire is of such magnitude and sign as to indicate that ice was in contact with the sensor wire. Due to water's heat of fusion, the effect of ice on the sensor wire is readily distinguished from the effect of water.

In one embodiment a probe assembly is provided which includes a probe tube extending at an angle to the direction of movement of the vehicle. The sensor and reference wires are positioned in separate thread grooves for protection and wound repeatedly around a portion of the probe tube. A heater is fitted in a hollow cavity of the probe tube to facilitate melting of ice which forms on the sensor wire.

29 Claims, 7 Drawing Figures

DETECTING ICE FORMING WEATHER CONDITIONS

BACKGROUND OF THE INVENTION

1. Field of the Invention

The invention relates to a process and apparatus for use on a vehicle, such as an airplane, to detect when weather conditions will cause ice to form on the vehicle.

2. Description of the Prior Art

Vehicles such as airplanes may be easily disabled by the formation of ice upon them. Accordingly, the detection of weather conditions which permit the formation of ice on a vehicle is of great practical concern. For instance, when an aircraft is in flight, the formation of ice upon it may restrict or immobilize control surfaces such as the ailerons, flaps, elevators, and rudder. Orifices such as pitot tubes, engine air intakes and so forth may also be partially blocked or completely obstructed by the formation of ice. If ice affects the movement of a control surface, the aircraft may become uncontrollable. Ice in a pitot tube may give false instrument indications to the pilot, resulting in possibly serious disorientation of the aircraft. Formation of ice in an air intake may cause severe engine damage or engine failure.

In addition, ice which forms on an aerodynamic surface may cause an adverse change in the aerodynamic contours of the surface, preventing continued flight of the aircraft due to loss of lift. Formation of ice anywhere on a plane may result in a change in its center of gravity, making the plane uncontrollable.

It has been apparent for many years that an aircraft pilot must either avoid potential ice forming weather conditions or insure that appropriate ice removal mechanisms on the airplane are enabled when ice could form on the airplane.

There are two basic requirements for weather conditions to allow the formation of ice on a vehicle. First, there must be free water vapor in the atmosphere available to form ice. That is to say, although the temperature may be −50 degrees C., if there is no free water vapor, i.e. the relative humidity is low, ice cannot form.

Second, the temperature of the vehicle must be at the freezing point of water or below. However, if the vehicle is moving, i.e. if it is an aircraft in flight, the ambient weather temperature may be below the freezing temperature of water, yet the motion of the vehicle though the air will heat the airflow above ambient temperature. If the ambient temperature is slightly below freezing, yet the vehicle is moving with sufficient velocity, ice may be prevented from forming by the effect of the vehicle upon the temperature of the air flowing past it.

With respect to an aircraft, it should be noted that the freezing point of water is also affected by the pressure. As pressure decreases, as happens when an airplane climbs, the freezing point of water will increase in temperature.

Prior art approaches to a process for detecting ice forming weather conditions have been unsatisfactory. For instance, the effect of the air velocity of the vehicle is usually not considered. This is an important consideration in the design of an accurate ice detection apparatus for use with an airplane that has operating velocities ranging over several hundred knots.

Another problem with prior art devices is the false generation of an ice present signal. Such false signal generation may occur in many ways. For instance, a sensor probe, if heated by the apparatus to remove ice on it, may have a temperature above that of the aircraft, therefore ice may not form on the probe yet form on the aircraft. Another problem is distinguishing in inclement weather whether ice or merely water is on the sensor probe.

Another problem with prior ice detection apparatus is the providing of a sensor probe which is sensitive and responsive, yet sufficiently hardy to withstand the extreme weather conditions to which it will be subjected.

A prior art ice detection apparatus is disclosed in U.S. Pat. No. 2,269,019, issued Jan. 6, 1942, entitled "Warning Device" to E. P. Hall. The Hall Patent teaches the utilization of a resistance element, whose resistance changes inversely in proportion to increasing temperature, which is exposed to the weather conditions. The resistance element is connected in series to a relay coil. A current is passed through the resistance element, and when its resistance is sufficiently low, the relay is energized to light an indicator lamp. A heating element in close proximity to the resistance element is periodically turned on to raise the temperature of the resistance element. If no ice is present on the resistance element, its temperature should rise sufficiently so as to increase its resistance to the extent that the relay will open, turning off the lamp. If icing conditions are encountered, the heating element will not heat the resistance element sufficiently to turn off the lamp. Accordingly, a steady state illumination of the lamp should indicate that ice forming conditions prevail. A blinking lamp should indicate that the resistance element is being exposed to "near" icy weather conditions.

The Hall apparatus, however, will not provide a reliable indication of ice forming weather conditions. For instance, water on the resistance element of Hall will have an effect similar to that of ice. The Hall apparatus depends upon the specific heat capacity of the ice to slow the temperature increase of the resistance element when the heater is turned on. However, water will provide a similar effect to that of ice in that its specific heat capacity may also cause the indicator lamp to remain on. Accordingly, the Hall device will generate false ice present signals when the weather conditions are inclement but not icy.

The Hall device also provides no compensation for the effect an aircraft's velocity through the air has upon the formation of ice upon it. The temperature of the resistance element at the end of the heater cycle is dependent not only on whether ice or water is on it, but also on the amount of heat bled off by the flow of air across it, a significant factor with high speed aircraft.

Another disadvantage to the Hall device is that it makes no provision to prevent the heating of the resistance element above the temperature of the aircraft. Accordingly, the Hall device may not generate an ice present signal when appropriate.

Another disadvantage to the Hall device is that it provides a blinking indicator lamp when conditions are potentially icy, the blink duration increasing whenever ice or water is on the resistance element until the lamp remains on steadily. This complicated interpretation of the indicator lamp is undesirable in modern aircraft. A simple yes/no indication is preferable.

Another disadvantage with the Hall device is that if the aircraft is flying in extremely cold dry weather, the indication lamp of the Hall device may remain on if the heater is unable to raise the temperature of the resistance element sufficiently due to the extreme cold. Nevertheless, the weather conditions would not permit the formation of ice due to the lack of free water vapor.

Accordingly, it is an object of the herein disclosed invention to provide a process and apparatus for detecting when weather conditions allow ice to form upon a moving vehicle. A further object of the invention is to provide such ice detection with compensation for the effect of the vehicle velocity upon the formation of ice upon it. It is a further object to provide a sensitive and responsive ice detection without the generation of false indications of ice forming conditions. It is a further object of the invention to provide a ice detection probe which is sensitive and responsive, yet sufficiently hardy to withstand the extreme weather conditions to which it will be exposed.

SUMMARY OF THE INVENTION

These and other objects are provided by the herein disclosed invention by subjecting two electrically conductive wires to the weather. A continuous fixed first voltage is passed through the "reference" wire and a pulse of fixed second voltage is passed through the "sensor" wire. An ice present signal is generated if the difference in the current flow during the pulse through the sensor wire and through the reference wire exceeds a specific ice threshold amount. The voltage pulse is sufficient to rapidly heat the sensor wire, however the rate of increase in temperature of the wire is determined by whether ice or water has formed upon it. The present invention distinguishes ice from water by the effect of water's heat of fusion, which requires the providing of significant amounts of energy to cause ice to melt. Unlike prior art devices, it is the effect of the heat of fusion of water rather than the specific heat capacity of ice which allows detection of the ice forming conditions, yet does not give a false indication when water is on the probe. In one embodiment, suitable control circuitry is provided to automatically melt ice formed on the probe after an ice present signal has been generated. Additionally, the control circuitry may repetitiously enable the pulsing of the sensor wire so long as the reference wire, whose resistance indicates the ambient temperature to which the reference wire is exposed, indicates that the ambient temperature is sufficiently low to allow the formation of ice.

The sensor probe of one embodiment has a probe tube extending at an angle to the expected forward direction of the moving vehicle. Around a portion of the tube are provided plural thread grooves. In the thread grooves are the sensor wire and reference wire. The thread grooves are of sufficient depth to allow the sensor and reference wires to be below the surface of the probe tube, insuring their protection against physical hazards. A heater may by included in the center of the tube to allow selective melting of ice formed on the sensor wire.

In one embodiment, the probe tube is of aluminum, and the sensor and reference wires are of platinum.

DETAILED DESCRIPTION OF PREFERRED EMBODIMENTS

The inventive process and apparatus for detecting ice forming conditions is based upon the effect of water's heat of fusion rather that its specific heat capacity as ice or water. A compound's heat of fusion is the amount of energy required to melt it from solid form to liquid form at the melting point temperature. For instance, it requires approximately 80 calories/gram of energy to melt ice at 1 atm. pressure at 0-degrees C. to water at the same pressure and temperature. The specific heat capacity of ice at 1 atm. is approximately 0.5 calories/gram/degree C. The specific heat capacity of water at 1 atm. is approximately 1 calorie/gram/degree C. As can be seen from these physical constants, it requires approximately 160 times as much energy to melt a quantity of ice at 0 degrees C. as it does to raise it from $-1$ to 0 degrees C. in temperature.

The present invention utilizes this property by passing a pulse of fixed voltage through a sensor, causing the sensor to be rapidly heated by the energy in the pulse. The sensor is exposed to the potential ice forming weather conditions. If ice is in contact with the sensor, the energy required to melt the ice at 0 degrees C. significantly affects the temperature of the sensor at the end of the pulse. The sensor temperature at the end of the pulse is measured by the inventive apparatus to determine if ice was in contact with the sensor.

Figure 1:
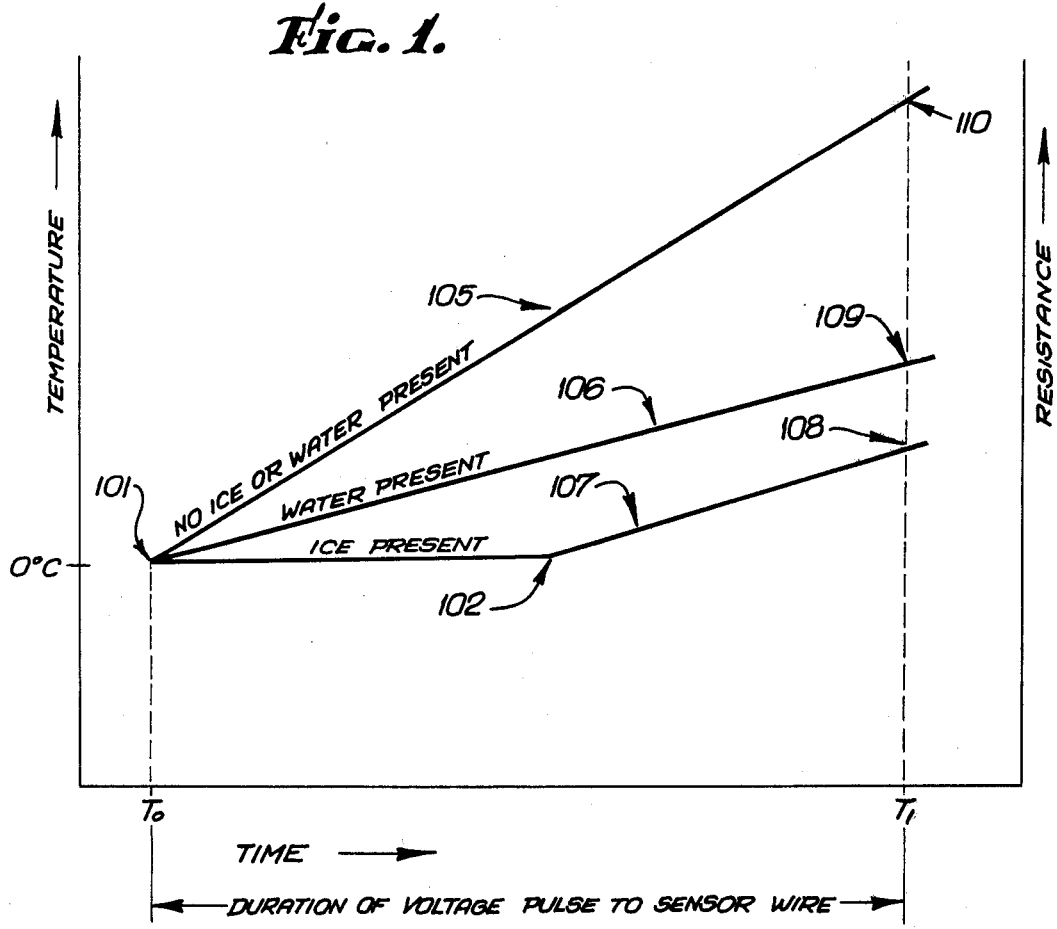
FIG. 1 is a graphical representation of the effect that ice and water will have upon the temperature or resistance of the sensor wire when it is rapidly heated by a voltage pulse.

FIG. 1 diagrammatically illustrates the effect of the heat of fusion of water upon the temperature of a sensor during a pulse of fixed voltage. The horizontal scale indicates time. $T_0$ indicates the start of the pulse of fixed voltage and $T_1$ indicates the end of the pulse. The vertical scale of the graph of FIG. 1 indicates the temperature of the sensor. The sensor temperature will affect its electrical resistance in a known manner. Accordingly, the left hand vertical axis indicates temperature whereas the right hand vertical axis indicates sensor resistance.

Graph 105 indicates the resulting temperature rise during a voltage pulse of a sensor which is not in contact with ice or water. Graph 106 illustrates the similar situation when the sensor is in contact with water. Graph 107 assumes that the sensor is in contact with ice. Each of these graphs 105, 106, 107 assumes that at $T_0$ the sensor is at 0 degrees C., i.e. the equilibrium point between the solid and liquid phase of water at 1 atm. Although segments of the graphs 105, 106, 107 are illustrated as straight, it should be understood that this is for illustrative purposes only inasmuch as there are numerous second order effects such as the non-linear relationship between sensor temperature and sensor resistance, and the varying specific heat capacities of ice and water at different temperatures which would cause these segments to be curved. Nevertheless, FIG. 1 diagrammatically illustrates the significant effect that the heat of fusion of water plays in the invention.

When the sensor is not in contact with ice or water, it will be heated at a higher rate than if ice or water is in contact with it. This is a result of the fact that when ice or water is in contact with the sensor, the ice or water will also be heated by the voltage pulse, reducing the rate of temperature increase of the sensor. Accordingly, graph 105 illustrates the effect upon a sensor not in contact with ice or water when subjected to the energy of a pulse of fixed voltage. As will be noted, this graph is steeper in slope than that of graph 106 or 107, even though all three graphs 105, 106, 107 intersect at point 101, indicating that the sensor is at 0 degree C. at the start $T_0$ of the voltage pulse.

When water is in contact with the sensor at the time of the voltage pulse, the specific heat capacity of water lowers the rate of temperature increase of the sensor. Accordingly, graph 106 indicates a slower rate of temperature increase of the sensor when it is in contact with water.

When ice is in contact with the sensor, the heat of fusion of water, namely 80 calories/gram requires that considerable energy be expended to melt the ice. Accordingly, graph 107 illustrates that the temperature of the sensor will remain at 0 degrees C. for an appreciable period of time during the voltage pulse before the ice is melted. The knee 102 in graph 107 is a transition point indicating when all the ice in contact with the sensor has been melted to water at 0 degrees C. From this point in time on the sensor, and water in contact with it, will rise in temperature at a rate similar to that shown in graph 106. Accordingly, the graph 107 after the knee 102 has a slope similar to that of graph 106. Of course, this assumes that the same amount of water is in contact with the sensor in either situation.

At the end $T_1$ of the voltage pulse, the temperature of the sensor will be the highest if it was not in contact with ice or water, as indicated at point 110. Point 109 on graph 106 illustrates the final temperature of the sensor at $T_1$ when water was in contact with the sensor. The lowest final temperature of the sensor is on graph 107 at point 108, illustrating the effect of the heat of fusion of water upon the resultant temperature rise of the sensor. Even though the final temperatures 110, 109, 108 of the three graphs 105, 106, 107 are significantly different, it must be remembered that the sensor started at the same temperature, 0 degrees C., at the start $T_0$ of the voltage pulse.

Although not illustrated in FIG. 1, the effect of ice upon the sensor at a temperature below 0 degree C. is similar.

Figure 2:
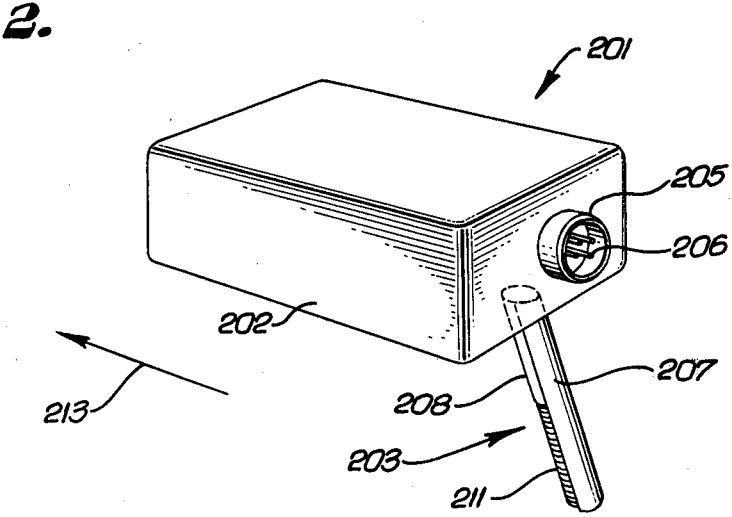
FIG. 2 is a perspective view of one embodiment of the ice detection apparatus.

FIG. 2 illustrates one embodiment of the inventive ice detection apparatus 201. In this embodiment a probe assembly 203 is attached to a housing 202 for the electronic circuitry of the inventive device. The embodiment illustrated in FIG. 2 may be utilized by affixing the circuit housing 202 to a moving vehicle, such as an airplane, so as to allow the probe assembly 203 to extend out into the airflow and be subjected to the ambient weather conditions. Arrow 213 illustrates the orientation of the probe assembly 203 with respect to the expected direction of forward movement of the vehicle.

It has been found desirable to orient the probe assembly 203 at least 30 degrees from the direction of forward movement of the vehicle. In the embodiment illustrated in FIG. 2, the probe is shown as tilted at an angle of approximately 120 degrees with respect to the forward direction 213 of the vehicle. In fact, the probe may be positioned as far back as 150 degrees with respect to the direction of forward movement of 213 of the vehicle. It should be remembered that if the vehicle is an airplane, the direction of the relative wind upon the probe is not determined solely by the direction of the vehicle, but is also determined by the angle of attack of the aircraft, direction of wind, etc. Accordingly, for an airplane, the probe assembly 203 must function in a sensitive and responsive manner despite the significant variations in direction of the relative wind upon the probe assembly 203 under all expected aeronautical and meteorological conditions. Accordingly, the angle of extension of the probe assembly 203 from the circuit housing 202 is not critical.

On one end of the circuit housing 202 is an electrical connector assembly 205. Electrical connection may be made to the circuit of the inventive ice detection apparatus 201 via the terminals 206 of the connector assembly 205.

The probe assembly 203 of the embodiment illustrated in FIG. 2 comprises an elongated cylindrical probe tube 211. The portion of the probe tube 211 not directly exposed to the airflow is shielded by a rear sheath 207. A portion of the probe tube 211 which is directly exposed to the airflow may be protected by a front sheath 208.

Figure 3:
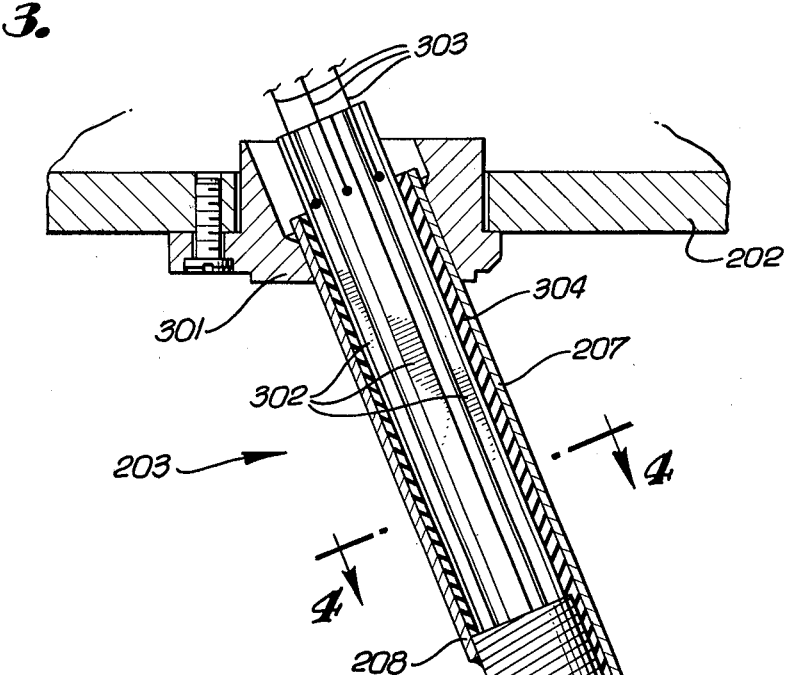
FIG. 3 is an elevation view, partly in section of an embodiment of the inventive sensor probe which may be utilized in the embodiment of the ice detection apparatus illustrated in FIG. 2.

FIG. 3 is a elevation view, partly in section, of a probe assembly 203 able to be utilized in the embodiment illustrated in FIG. 2. The probe tube 211 is a cylindrical tube with a hollow cavity. The rear sheath 207 (shown sectionally in FIG. 3) and front sheath 208 (also shown sectionally in FIG. 3) combine to surround the portion of the probe tube 211 which does not contain windings of a sensor wire 204 and a reference wire 209 around the probe tube 211. Additionally, the rear sheath 207 may extend from one end of the probe tube 211 to the other, thereby protecting that portion of the probe assembly 203 which is not directly exposed to the airflow. A potting material 304 may be inserted between the sheaths 207, 208 and the probe tube 211 to ensure a mechanically strong probe assembly 203.

An additional advantage to having the rear sheath 207 cover the portion of the probe tube 211 and wires 204, 209 not directly exposed to the airflow is that it may serve to bring into thermal equilibrium the portions of the sensor wire 204 and reference wire 209 in contact with it. This tends to enhance the signal-to-noise ratio of the apparatus 201 by insuring that only the portion of the sensor wire 204 on which ice will first form, i.e. the portion directly facing the airflow, is exposed to the weather conditions.

At the end of the probe tube 211 a plug 214 may be inserted to cap the hollow cavity of the probe tube 211. The probe assembly 203 is attached to the circuit housing 202 via a fitting 301 configured to allow the lead-in conductors 302 from the sensor wire 204 and reference wire 209 into the interior of the circuit housing 202, yet insure that the circuitry in the circuit housing 202 is not exposed to adverse operating conditions.

Figure 4:
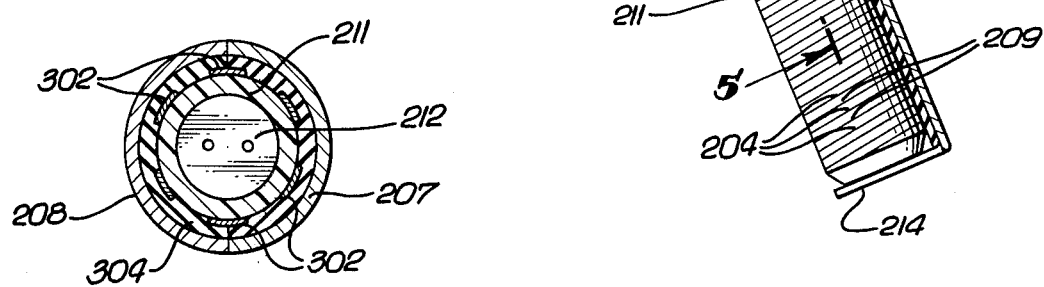
FIG. 4 is a sectional view along line 4—4 of a portion of the probe of FIG. 3.

FIG. 4 is a sectional view through a portion of the probe assembly 203, showing the manner in which the front sheath 208, rear sheath 207 and potting 304, surround the lead-in conductors 302 which electrically couple the circuitry of the inventive ice detection apparatus 201 to the sensor wire 204 and reference wire 209. These lead-in conductors 302 are positioned on the probe tube 211. The hollow cavity of the probe tube 211 contains a heater 212 which may controllably heat the probe tube 211 to melt ice formed on the sensor wire 204. In order to maximize the effectiveness of the heater 212, it is desirable to position it in the cavity portion of the probe tube 211 which is directly below the windings of the sensor and reference wires 204, 209.

The probe tube 211 in one embodiment is made of aluminum with an electrically insulating aluminum oxide coating on its surface. This material is advantageous because its relatively low specific heat capacity and high thermal conductivity allows it to be readily heated by the heater 212 and equally quickly cooled by the ambient weather conditions. Other materials having similarly "responsive" heat characteristics may be readily utilized.

Figure 5:
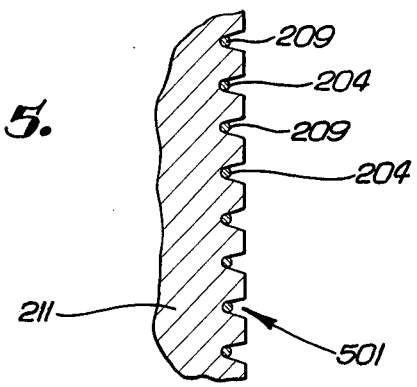
FIG. 5 is a sectional detail of a portion of the probe of FIG. 3, illustrating the protected sensor and reference wires.

FIG. 5 is a sectional detail of a portion of the probe tube 211 which contains the windings of the the sensor wire 204 and reference wire 209 in the thread grooves 501. Each thread groove 501 contains a single wire, whether sensor 204 or reference 209.

In one embodiment of the inventive device, the sensor wire 204 utilized two thread grooves 501. The sensor wire 204 was wound down the probe tube 211 to the area in proximity to the plug 214, and then wound back along the other thread groove 501 to the middle portion of the probe tube 211. Such a technique allowed for the easy attachment of lead-in conductors 302 to the sensor wire 204 at the middle portion of the probe tube 211.

Of course, this technique of utilizing a pair of thread grooves 501 to provide for the winding of the sensor wire 204 down the probe tube 211 and back may be extended arbitrarily by utilizing additional pair of thread grooves 501. A similar technique may be utilized with the reference wire 209. Such a technique allows the length of the sensor wire 204 or reference wire 209 to be increased as desired to improve sensitivity, or to simplify the electronic circuitry of the inventive device 201. In fact, in one embodiment of the invention, the reference wire 209 was made approximately twice as long as the sensor wire 204 in order to simplify the circuitry of the inventive device 201 by eliminating resistors which would have otherwise have been required to be in series with the reference wire 209. This was provided for by utilizing four thread grooves 501 for the reference wire 209 and two thread grooves 501 for the sensor wire 204.

The thread grooves 501 have depth sufficient to insure that the wires 204, 209 may be positioned below the surface of the probe tube 211. This insures that the wires 204, 209 are protected against most physical hazards, yet are directly exposed to the airflow.

The sensor wire 204 and reference wire 209 may be made of any suitable electrical conductor. As will be discussed below, the inventive electrical circuit of the apparatus 201 utilizes the known relationship between the temperature of a wire and its electrical resistance. Since the variation in electrical resistance with temperature is a physical property inherent in all matter, the factors involved in deciding on a choice of material for the wires 204, 209 include whether it is sufficiently hardy to withstand the exposed weather conditions, and whether its change in resistance with temperature change is readily detectable. In one embodiment, the wires were made of platinum. Platinum is easily formed into wires, and is relatively unreactive to chemicals it is likely to be exposed to. In addition, the effect of temperature upon its resistance is readily detectable.

Of course, if the probe tube 211 is made of an electrically conductive material such as aluminum, the wires 204, 209 must be electrically insulated from it. In one embodiment, the surface of the aluminum probe tube 211 was covered with an aluminum oxide, providing the necessary insulation between the probe tube 211 and wires 204, 209.

Figure 6:
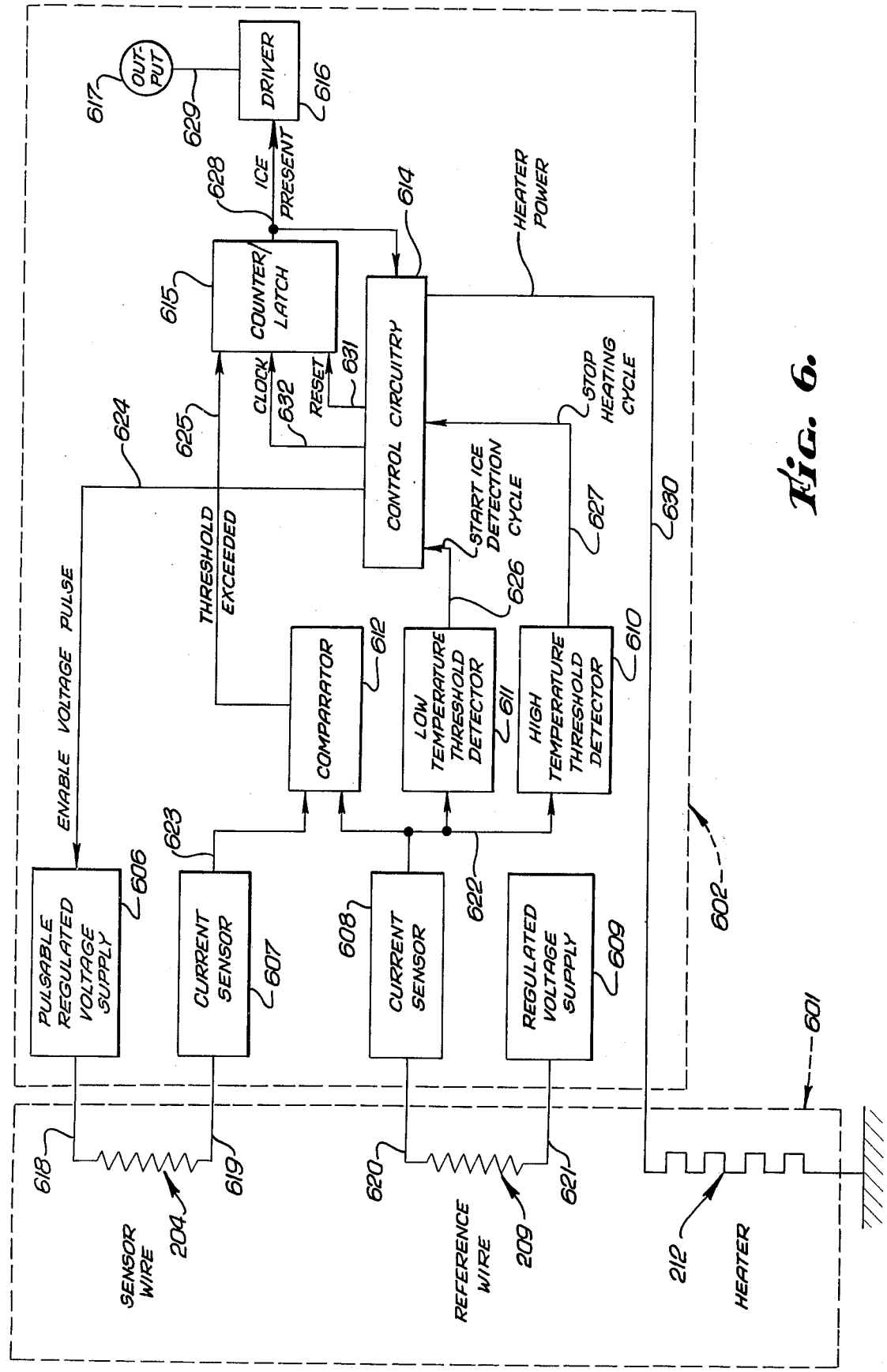
FIG. 6 is an electrical block diagram of one embodiment of the inventive apparatus.

FIG. 6 is an electronic block diagram of the circuitry utilized in one embodiment of the invention. The invention detects the presence of ice upon the probe tube assembly 203, and specifically the sensor wire 204, by passing a pulse of constant voltage through the sensor wire 204. The pulse is of sufficient amplitude to cause the sensor wire 204 to rapidly heat during the pulse. A continuous voltage is impressed across the reference wire 209. The current flow through the sensor wire 209 during the pulse is compared with the current flow through the reference wire 209 during the same time period. When the difference in current exceeds a certain "ice present" threshold, caused by the reduction in rate of increase in temperature of the sensor wire 204 due to its being in contact with ice, an "ice present" signal is generated.

The heater 212 is then enabled, melting ice which has formed on the sensor wire 204. The heater 212 may be turned off after detection of an increase in resistance of the reference wire 209 which would indicate that the probe tube 211 has been sufficiently heated to melt any ice which accumulated on the sensor wire 204.

In order to reduce power consumption, the pulses through the sensor wire 204 may be suspended when the current flow through the reference wire 209 indicates that the ambient temperature to which the probe tube 211 is exposed is too high to permit ice to form.

In more detail, FIG. 6 illustrates an the embodiment of electronic circuitry 602 able to be utilized in the inventive device. A regulated voltage supply 606 is provided which may impress a pulse of fixed constant voltage across the sensor wire 204 via conductor 618 when it is appropriately enabled via signal line 624. A second regulated voltage supply 609 supplies a continuous voltage through reference wire 209 via electrical connection 621.

For a constant voltage, Ohm's law dictates that the resistance of a wire is inversely proportional to the current flow through it. Accordingly, a current sensor 607 measures the current flow through the sensor wire 204 during the pulse and provides an appropriate signal to a comparator 612 via signal line 623. Similarly, a current sensor 608 measures the current flow through the reference wire 209 and provides it to the comparator 612 via signal line 622. Control circuitry 614 is provided to selectively enable the pulsable regulated voltage supply 606.

The voltage pulse generated by the pulsable voltage supply 606 is of sufficient amplitude to cause the rapid heating of the sensor wire 204 during the pulse, causing the electrical resistance of the sensor wire 204 to change during the pulse. The amount of resistance change depends on whether the sensor wire is in contact with ice or water. As discussed earlier in connection with FIG. 1, an analysis of the resistance (i.e., temperature) of the sensor wire while the pulse of voltage is heating it will indicate whether the sensor wire 204 is in contact with ice or water, or is in contact with neither. The reference wire 209, subjected to a continuous fixed voltage, has its resistance affected according to the ambient temperature to which it is exposed.

The voltage impressed across the reference wire 209 is chosen to be sufficiently low so as to not cause appreciable heating of the reference wire 209 above ambient temperature. The reference wire 209 provides, via current sensor 608, an input to comparator 612 which is utilized to compensate for the ambient temperature. Inasmuch as the voltage pulse does not heat the reference wire 209, the resistance of the reference wire 209 will correspond to the ambient temperature, whether or not it is covered with ice or water.

The comparator 612 presents on signal line 625 a digital "threshold exceeded" signal based on the difference in current flow between the sensor wire 204 and reference wire 209. When the difference in current flow through the wires 204, 209 indicates that ice is in contact with the sensor wire 204, the threshold exceeded signal takes a value indicative of this event. The threshold exceeded signal is provided to a counter/latch 615.

In the embodiment of the invention illustrated in FIG. 6, at the end of the voltage pulse generated by the pulsable regulated power supply 606 the control circuitry 614 provides a clock pulse on signal line 632 to the counter/latch circuit 615. In order to reduce the likelihood of false ice present indications, the counter/latch circuitry 615 generates an ice present signal on line 628 only after consecutive enable voltage pulses result in the generation of a threshold exceeded signal on line 625. When a clock pulse is received by the counter/latch circuitry 615 via signal line 625, the counter/latch circuitry 615 determines whether the threshold exceeded signal is present. In one embodiment, the counter/latch circuitry 615 will continue to generate the ice present signal on line 628 for approximately 12 seconds after consecutive pulses generate a threshold exceeded signal. Signal line 628 presents the ice present signal to an appropriate signal driver 616 for output 617. The output 617 may be connected to automatic deicing equipment, to a warning light on the aircraft instrument panel, or other such devices.

The heater 212 is cycled on by the control circuitry 614 via signal line 630 whenever the counter/latch circuitry 615 indicates on signal line 628 that ice appears to be present on the sensor wire 204. The output of the reference wire current sensor 608 is provided via signal line 622 to a high temperature threshold detector 610. This threshold detector 610 is utilized to determine when the current flow through the reference wire 209 corresponds to a probe assembly 203 temperature sufficiently high to melt any ice which had accumulated on the sensor wire 204. When the high temperature threshold detector 610 determines that any ice present on the sensor wire 204 should have been melted, a stop heating cycle signal is generated on line 627 and provided to the control circuitry 614 so that it may turn off the heater.

In order to reduce the power consumption of the inventive circuitry 602, a start ice detection cycle signal 626 is provided to the control circuitry 614 whenever the current flow through the reference wire 209 indicates that the ambient temperature to which the reference wire is being exposed is sufficiently low to permit ice to form. The low temperature threshold detector 611 receives as input the output of the reference wire current sensor 608 via signal line 622. In one embodiment, the low temperature threshold detector 611 is set to start the ice detection cycle when ambient temperatures are at 1 degree C. or below. It should be noted that since the reference wire 209 is exposed to the airflow generated by a moving vehicle to which it is attached, the "ambient" temperature which is measured by the reference wire 209 current flow is the the effective temperature on the probe tube 211 of the weather conditions, as affected by the velocity of the vehicle and wind velocity.

Until the control 602 circuitry receives the start ice detection cycle signal on line 626, the enable voltage pulse signal on line 624 is not generated. Accordingly, until the temperature is sufficiently low to allow formation of ice on the sensor wire 204, little or no power is consumed by the heater 212 or pulsable regulator voltage supply 606.

In order to insure that the detection of ice forming weather conditions is unaffected by the bleeding of heat from the sensor wire 204 by the airflow generated by the velocity of the vehicle to which the apparatus 201 is attached, the pulse generated by the pulsable regulator voltage supply 606 should be very short in duration. The shorter the duration of the pulse, the less likely that the airspeed of the vehicle may cause the improper generation of an ice present signal. When the invention is utilized in an aircraft having operational airspeeds spanning several hundred knots, it has been found desirable to provide a pulse duration of 100 ms. (milliseconds) or less. Suitable responsiveness and accuracy have been obtained with a voltage pulse duration of 30 msec. Such a short pulse duration causes the sensor wire 204 to be rapidly heated by a voltage pulse, reducing the likelihood of false ice present indications due to heat being bleed off by the high velocity airflow. In such an embodiment, a 20 volt pulse for 30 msec. through a sensor wire 204 having resistance approximately 4.8 ohms at 0° C. has been found to satisfactorily heat the wire 204 during the voltage pulse.

In order to ensure that the inventive apparatus 201 is sensitive to sudden changes in weather conditions, one embodiment of the control circuitry 614 was configured to generate a voltage enable pulse on signal line 624 approximately every two seconds.

Figure 7:
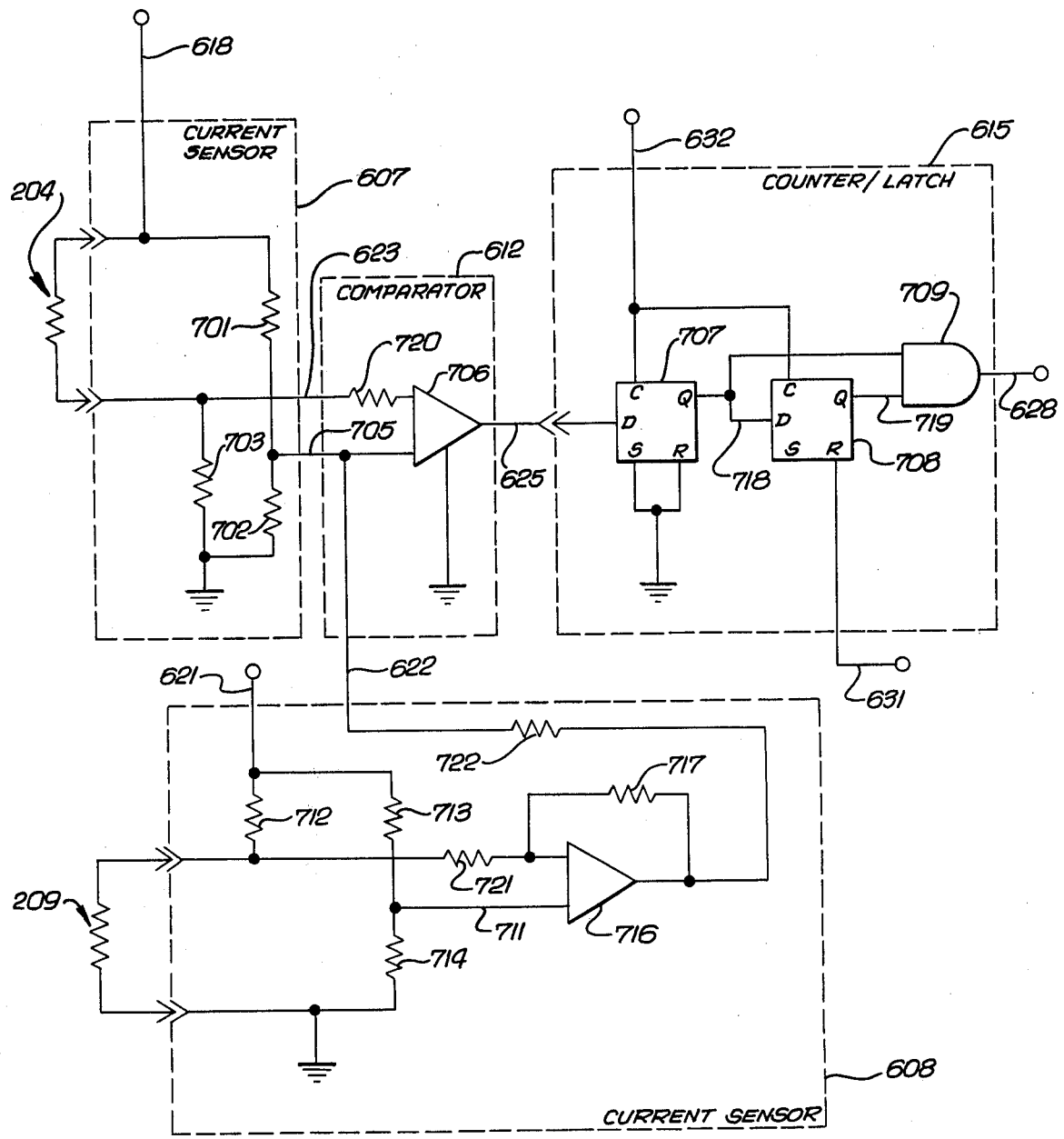
FIG. 7 is an electrical schematic of a portion of the circuit of the embodiment of FIG. 6.

FIG. 7 is a more detailed electrical schematic of certain portions of the circuitry of the embodiment of the invention portrayed in FIG. 6. Illustrated in FIG. 7 are the circuitry for the current sensors 607, 608, comparator 612, and counter/latch circuitry 615.

The output 618 of the pulsable regulated voltage supply 606 is passed across the sensor wire 204 and a resistor 703 to ground, forming a voltage divider to ground. Inasmuch as resistor 703 has essentially constant resistance, the variation in resistance of the sensor wire 204 in accordance with the change in its temperature will cause a concomitant change in the current flow through resistor 703. The resultant voltage drop across resistor 703, indicative of the sensor wire 204 temperature, is an input to the comparator 612 via wire 623.

In the embodiment illustrated, the comparator comprises an operational amplifier which is in an "open loop" configuration, i.e. there is no feedback between the output 625 of the op amp and either of its inputs 623, 622. The open loop configuration of op amp 706 causes it to operate as a comparator, i.e. its output 625 provides a digital binary signal determined by the difference between its inputs 622, 623. Resistors 720 and 722, as well as the resistors in the current sensors 607, 608 are chosen to cause the op amp 706 to switch between its two output states based on whether its inputs 622, 623 indicate that the sensor wire is in contact with ice during a voltage pulse. In the embodiment illustrated in FIG. 6, when signal line 625 is high, ice was present on the sensor wire 204 during a voltage pulse.

A second voltage divider is provided by resistors 701 and 702. The voltage at the point between these resistors 701, 702 is passed via a wire 705 to the second input of the op amp 706. This second voltage divider is utilized to ensure that any variations in the voltage supplied by the pulsable regulated power supply 606 will not affect the comparator 612. In addition, this second input to the op amp 706 also includes signal line 622, i.e. the output of the current sensor 608 connected to the reference wire 209.

This second current sensor 608 also comprises a voltage divider, utilizing resistor 712 and the reference wire 209, to provide via resistor 721 an input to operational amplifier 716. The variation in resistance of the reference wire 209 in accordance with the change in ambient temperature will cause a concomitant change in the current flow through the reference wire 209. The resulting voltage drop across the reference wire 209 is provided, via resistor 721, as an input to op amp 716.

Another voltage divider, comprising resistor 713 and 714, is utilized to provide the second input 711 to op amp 716. This second input 711 is utilized to ensure that variations in voltage supplied by the regulated voltage supply 609 will not affect the output 622 of current sensor 608.

Resistor 717 establishes the gain of the op amp 716 as required to appropriately scale the output 622 of the current sensor 608.

The threshold exceeded output 625 of the comparator 612 is provided to a flip-flop 707. A clock pulse, received on signal line 632 from the control circuitry 614, is provided to the flip-flop 707. The clock pulse will be generated by the control circuitry 614 at or near the end of each voltage pulse generated by the pulsable regulated voltage supply 606, i.e., after the sensor wire 204 has reached its final temperature due to the pulse. If, at the leading edge of a clock pulse, signal line 625 is high (i.e., ice was present on the sensor wire 204) the flip-flop output, signal line 718, will be set high. Conversely, if at the time a clock pulse is received on signal line 632, the input 625 to the flip-flop 707 is low, the output 718 will correspondingly be low. The output 718 of the flip-flop 707 is provided to AND gate 709 and a second flip-flop 708. At the leading edge of the next clock pulse received via signal line 632, this second flip-flop 708 will propagate the value present at that time on signal line 718 to its output 719, which is also provided to AND gate 709. The AND gate 709 generates the ice present signal on signal line 628 whenever the outputs 718, 719 of the flip-flops 707, 708 are simultaneously true. This will occur if at the leading edge of two consecutive clock pulses received via signal line 632, there is a threshold exceeded signal on signal line 625, indicating that ice was present on the sensor wire during the voltage pulse. A reset signal to the counter/latch circuitry 615 is provided on signal line 631. This reset signal serves to clear the second flip-flop 708, and thereby reset the counter/latch circuitry 615.

Although the embodiment of FIGS. 2 and 3 illustrates a form of the invention in which the probe assembly 203 is directly affixed to the circuit housing 201, in other embodiments the probe assembly 203 may be physically separated from the electronic circuitry 602 of the invention. By suitable electronic cabling, the probe assembly 203 may be placed at any desired distance from the remaining electrical circuitry 602.

While only a limited number of the embodiments of the invention have been discussed herein, it will be readily apparent to persons skilled in the art that certain changes or modifications may be made without departing from the spirit of the invention. Accordingly, the foregoing disclosure, description, and figures are for illustrative purposes only, and do not in any way limit the invention, which is defined only by the claims.

What is claimed is:

1. An ice detector probe for use in an apparatus detecting ice forming weather conditions, comprising:
    a probe tube exposed to weather conditions, having a hollow center, with first and second thread grooves around a first portion of its outer surface;
    a reference wire, having two ends, wound in said first thread groove, said reference wire having an electrical resistance between its two said ends which varies with the temperature of said reference wire;
    continuous voltage means for supplying a continuous voltage to the reference wire;
    a sensor wire, having two ends, wound in said second thread groove, said sensor wire having an electrical resistance between its said two ends which varies with the temperature of said sensor wire;
    pulse voltage means for supplying a pulse of voltage to the sensor wire;
    comparator means, operably connected to said reference wire and said sensor wire, for generating an ice-present signal when the resistance of said sensor wire during said pulse, when compared to the resistance of said reference wire, indicates that ice was in contact with said sensor wire during said pulse; and
    a heater, configured to fit in said hollow center of said probe tube and so positioned, selectively controllable to melt ice in contact with said sensor wire.

2. A probe according to claim 1 for use with a moving vehicle wherein said probe tube is cylindrical with a generally straight longitudinal axis, said probe tube configured to attach at a first end to said vehicle and project from said vehicle at a projection angle between 30 degrees and 150 degrees, said projection angle having a first side along said longitudinal axis and a second side intersecting said first side, in the direction of forward movement of said vehicle.

3. A probe according to claim 1 wherein said first and second thread grooves are of depth to result in said reference wire and sensor wire being positioned below the outer surface of said probe tube, thereby protecting said wires against undesired physical contact.

4. A probe according to claim 1 wherein said probe tube is aluminum with an outer aluminum oxide insulating layer, and wherein said sensor and reference wires are platinum.

5. A probe according to claim 2 further comprising a sheath member configured to cover portions of said probe tube, reference wire and sensor wire on the side of a first plane opposite the direction of forward movement of said vehicle, said first plane passing through said longitudinal axis and perpendicular to the plane formed by the sides of said projection angle.

6. An apparatus according to claim 2 wherein said probe tube has other thread grooves around said first portion of said probe tube, and wherein one of said sensor wire and said reference wire is also wound in said other thread grooves to bring the ends of said wire into proximity with said probe tube first end.

7. An ice detection apparatus for determining whether weather conditions are ice forming, comprising:
   pulse voltage means for supplying a pulse of fixed first voltage;
   sensor means, directly exposed to said weather conditions and electrically connected to said pulse voltage means, for presenting an electrical resistance in accordance with the temperature of said sensor means;
   continuous voltage means for supplying a continuous fixed second voltage;
   reference means, exposed to the ambient temperature to which said sensor means is exposed and electrically connected to said continuous voltage means, for presenting an electrical resistance indicative of said ambient temperature; and
   comparator means, electrically connected to said sensor means and said reference means, for generating an ice-present signal when the resistance of said sensor means during said pulse, when compared to the resistance of said reference means, indicates that ice was in contact with said sensor means during said pulse.

8. An apparatus according to claim 7 further comprising heater means, thermally coupled to said sensor means, for heating said sensor means to melt ice in contact with said sensor means.

9. An apparatus according to claim 7 wherein said pulse voltage means is selectively enabled, and further comprising ambient temperature detection means, electrically coupled to said reference means, for enabling said pulse voltage means only when the resistance of said reference means is less than a fixed 'ambient temperature' threshold corresponding to an ambient temperature indicative of potential ice-forming conditions.

10. An apparatus according to claim 9 wherein said ambient temperature detection means is configured to enable said pulse voltage means when said ambient temperature is less than 1 degree C.

11. An apparatus according to claim 8 wherein said heater means may be selectively enabled and is thermally coupled to said reference means, and further comprising high temperature detection means, electrically connected to said reference means, for enabling said heater means after said pulse until the current flow through said reference means decreases below a fixed high temperature threshold indicating that ice in contact with said sensor means will have been melted by said heater means.

12. An apparatus according to claim 7 wherein said sensor means and said reference means comprise wires consisting essentially of platinum.

13. An apparatus according to claim 12 further comprising a probe tube, having a generally cylindrical shape, with a hollow cavity, said sensor means and said reference means wound around said probe tube, and said heater means inserted in said hollow cavity.

14. An apparatus according to claim 7 wherein said pulse voltage means is configured to generate said pulse with a duration under 100 msec.

15. An apparatus according to claim 14 wherein said pulse duration is approximately 30 msec.

16. An apparatus according to claim 7 wherein said fixed first voltage is of magnitude to heat said sensor means during said pulse.

17. A process for determining whether weather conditions are ice-forming, comprising:
   subjecting first and second electrically conductive wires to said weather conditions, said wires each having a resistance varying with temperature;
   generating a continuous fixed first voltage through said first wire;
   said voltage being sufficiently low so that no substantial heating of said reference wire occurs
   passing a pulse of fixed second voltage through said second wire;
   said pulse of voltage having fixed duration of time and of a magnitude sufficient to cause resistive heating of said sensor wire within said duration and
   forming an ice-present signal when during said pulse, the difference in current flow through said first wire and through said second wire exceeds a certain threshold amount.

18. A process according to claim 17, further comprising after said forming step:
   heating said second wire to melt ice formed on said second wire.

19. A process according to claim 17 wherein said step of passing forms said voltage pulse with duration under 100 msec.

20. A process according to claim 18 wherein said step of heating also heats said first wire, said heating continuing until the current flowing through said first wire exceeds a fixed 'melt' threshold which indicates that ice on said second wire should be melted.

21. A process according to claim 17 wherein said step of passing is performed only when the current flow through said first wire is less than a fixed 'low temperature' threshold which indicates that said weather conditions are potentially ice-forming.

22. A process according to claim 17 wherein said step of passing is repeated no more frequently than once per second.

23. A process according to claim 22 wherein said steps of passing, generating and forming are repeated, and further comprising after said step of forming:
   providing said ice-present signal as an output for a fixed latch time period after consecutive repetitions each result in the formation of said ice-present signal.

24. An apparatus for detecting when weather conditions are ice-forming, comprising:
   first and second electrically conductive wires, said wires having a resistance varying with temperature, said wires being directly exposed to said weather conditions;
   means for generating a continuous fixed first voltage through said first wire;
   said voltage being sufficiently low so that no substantial heating of said reference wire occurs
   means for passing a pulse of fixed second voltage through said second wire; and
   means for forming an ice-present signal when the difference in current flow during said pulse through said first wire and through said second wire exceeds a certain threshold amount.

25. An ice detector, comprising:
   a sensor probe having a sensor wire and a reference wire mounted thereto, said probe being exposable to the environment, the electrical resistance of each of said sensor and reference wires being proportional to the temperature thereof;

a constant voltage source connected to said reference wire, said voltage being sufficiently low so that no substantial heating of said reference wire occurs, whereby the resistance of and hence the current flow through said reference wire is substantially indicative of the effective environmental temperature;

a pulsed voltage source means for intermittently providing to said sensor wire a pulse of voltage having fixed duration of time and of a magnitude sufficient to cause resistive heating of said sensor wire within said duration, the temperature rise of said wire being least in the presence of ice on said sensor probe as a result of the transfer of the heat of fusion from said sensor wire to said ice, the temperature rise being more in the presence of water on said sensor probe, and being most in the absence of both water and ice, the resistance and hence the current flow through said sensor wire being indicative of the temperature of said sensor wire; and comparator means, operative at the end of said pulse duration time, for comparing the effective resistance of said sensor wire and said reference wire, and for producing a signal indicative of the result of such comparison, said signal thereby being indicative of whether conditions for ice formation are present.

26. An ice detection apparatus for determining whether weather conditions are ice forming, comprising:

first resistive means, responsive to said weather conditions, for presenting an electrical resistance in accordance with the temperature of said first resistive means;

pulse voltage means for supplying a pulse of voltage to the first resistive means to heat the first resistive means to melt ice in contact with the first resistive means;

second resistive means, responsive to the same ambient temperature to which said first resistive means is exposed, for presenting an electrical resistance indicative of said ambient temperature; and comparator means, operably connected to said first and second resistive means, for generating an ice-present signal when the resistance of said first resistive means when compared to the resistance of said second resistive means, indicates that ice was in contact with said first resistive means during said pulse.

27. An ice detection apparatus for determining whether weather conditions are ice forming, comprising:

pulse voltage means for supplying a pulse of fixed first voltage when enabled;

sensor means, directly exposed to said weather conditions and electrically connected to said pulse voltage means, for presenting an electrical resistance in accordance with the temperature of said sensor means;

continuous voltage means for supplying a continuous fixed second voltage;

reference means, exposed to the ambient temperature to which said sensor means is exposed and electrically connected to said continuous voltage means, for presenting an electrical resistance indicative of said ambient temperature;

comparator means, electrically connected to said sensor means and said reference means, for generating an ice-present signal when the resistance of said sensor means during said pulse, when compared to the resistance of said reference means, indicates that ice was in contact with said sensor means during said pulse;

heater means, thermally coupled to said sensor means and reference means, for heating said sensor means and reference means when enabled, to melt ice in contact with said sensor means and reference means;

ambient temperature detection means, electrically connected to said reference means, for generating a start detection signal when the resistance of said reference means indicates said ambient temperature is sufficiently low to allow water to freeze;

high temperature detection means, electrically connected to said reference means, for generating a reset signal when said heater means is enabled and the resistance of said reference means indicates that said heater means has heated said reference means and sensor means to a temperature sufficiently high so as to melt ice in contact with said sensor means; and control means, receiving said reset signal and said start detection signal, for repetitious spaced enabling of said pulse voltage means while receiving said start detection signal, and for enabling said heater means upon receiving said ice-present signal until receiving said reset signal.

28. An apparatus according to claim 27, further comprising:

counter means, receiving said ice-present signal and coupled to said control means, for generating an output signal after detecting occurrences of said ice-present signal upon consecutive enablements by said control means of said pulse voltage means.

29. An apparatus according to claim 27 wherein said control means is configured to insure said pulse voltage means is enabled no more frequently than once per second.

* * * * *